Feb. 12, 1963 C. H. WHITMORE 3,077,132
FEED CONTROL FOR BAND SAWS
Filed Feb. 15, 1960 5 Sheets-Sheet 1

Fig. 1.

INVENTOR
Charles H. Whitmore
BY
ATTORNEY

3,077,132
FEED CONTROL FOR BAND SAWS
Charles H. Whitmore, Minneapolis, Minn., assignor to Continental Machines, Inc., Savage, Minn., a corporation of Minnesota
Filed Feb. 15, 1960, Ser. No. 8,681
14 Claims. (Cl. 83—201)

This invention relates broadly to metal cutting tools, and refers more particularly to band saws and endless band-type cutoff saws like that illustrated in the Crane et al. Patent No. 2,898,669. The broad purpose of the invention is two-fold—to provide an improved feed control which assures a substantially uniform cutting rate despite changes in the cross-sectional shape of the work being sawed, and to maintain substantially uniform band loading by eliminating the effects of such factors as variations in the width of the band and lack of straightness thereof, known as "dog leg."

In cutoff saws, the pulleys about which the band or blade are trained are carried by a head or frame which is mounted for up and down motion above the base of the machine. The work to be cut is supported on the base and the cutting action takes place as the saw carrying frame descends.

In earlier band-type cutoff machines, the saw carrying frame was simply hinged to the base and as it swung down, the lower stretch of the band cut through the work. In the cutoff saw of the aforesaid Crane et al. patent, it is the top stretch of the band which performs the cutting action, and the head or frame carrying the saw, instead of being hinged to the base, is slidably mounted upon vertical guide posts which constrain it to a vertical translatory motion.

Hydraulic cylinders elevate the head or frame, and by regulating the discharge of the fluid from the cylinders, its descent may be controlled.

With a view toward preventing binding or "hang-up" of the frame on its guide posts, a torque bar and linkage device was provided in the cutoff saw of the aforesaid Crane et al. patent, to constrain both ends of the frame to move in unison. However, despite this and all other precautions that were taken to assure smooth uninterrupted descent of the frame during sawing, "hang-up" or unevenness in the descent of the frame was inevitable. As a result, there were serious fluctuations in the load upon the saw band or blade and highly objectionable variations in the cutting rate.

To appreciate this situation, it should be understood that the cutting stretch of the saw band or blade is held in proper position to effect the desired cutting action by saw guides located just ahead of the point at which the saw enters the work and just beyond its point of emergence from the work. In addition to engaging the opposite sides or faces of the band and constraining it to its required vertical disposition, these guides also include so-called backup bearings which bear against the back edge of the band or blade, and apply downward feeding force on the band.

The backup bearings are, of course, mounted on the saw carrying head and, in the past, were rigidly held with respect thereto, i.e. they had no vertical motion independent of the frame or with respect thereto. Thus, any interference with the smooth descent of the head would have a direct influence upon the feeding force applied to the band.

Another serious difficulty that was heretofore encountered in band-type cutoff saws, due to the manner in which the cutting stretch of the band or blade was guided, resulted from the fact that saw bands inevitably are not uniform in width, and also, despite all precautions to the contrary, it is practically impossible to produce a saw band or blade which is absolutely straight. A certain amount of so-called "dog leg" is inescapable.

These inherent characteristics of band saw blades, plus the periodic "hang-up" in the descent of the saw frame caused by binding at the guide posts or in the hydraulic cylinders, resulted in very serious variations in loading upon the band and, of course, also upon the drive mechanism therefor.

To illustrate, using the conventional prior art saw guides and backups, a variation of as much as 114 lbs. in the loading of the band was observed at one of the two guides, and 99 lbs. at the other, in one revolution or cycle of the band. The present invention reduced these variations to only 28 lbs. and 15 lbs., respectively.

The present invention overcomes the indicated objections of the prior art through its use of an improved backup bearing structure. This backup bearing, instead of being secured in a fixed position, has a degree of up and down movement with respect to the frame or head. In addition, it is resiliently or yieldably urged in the direction towards the saw band to maintain a substantially constant sawing force, compensating for dog-leg and variations in band width and for momentary interruptions to smooth descent of the saw head by "hang-up" or binding at the guide posts upon which the head or frame slides and in the hydraulic cylinders which regulate the descent of the head.

This is, of course, a significant and important advantage and improvement over the art; but the present invention has an even greater value.

An important consideration in the economical and efficient operation of a band sawing machine is the cutting rate at which the machine is operated, and which is defined as square inches of cut per unit time. For each material, and also for each saw, there is an optimum cutting rate at which performance of the machine is most economical and efficient. Substantial variations from this cutting rate, either upwardly or downwardly, can bring about a material reduction in operating economy, having in mind not only blade life of the saw band itself but also such considerations as the costs of labor and overhead. Consequently, it is extremely desirable to maintain the cutting rate as uniformly as possible at the optimum rate.

While reduction in variations in band loading goes a long way toward achieving a uniform cutting rate, variations in the cross section of the work being cut are by far the most serious source of this difficulty. For instance, assume that a cut is being made through a piece of steel twelve inches wide. For this particular material, and for the particular saw blade being used, there is an optimum cutting rate. If now, the cross section of the work piece is such that as the cut deepens, the width of the piece abruptly changes to two inches, then, obviously, unless the feeding force is also correspondingly reduced, the cutting rate will be greatly increased and the saw no longer will be cutting at the optimum rate.

Of course, the machine could be manually readjusted, but this is obviously objectionable if automatic compensation can be had. The present invention provides it.

Hence, it is one of the most important objectives of this invention to provide a feed control for machine tools, and especially band saws and band-type cutoff saws, by which the feeding force is automatically adjusted whenever necessary to maintain a substantially uniform cutting rate.

More specifically, it is the purpose of this invention to provide a control for the feed of a band saw and band type cutoff saw, whereby the feed rate is at all times corelated with the cross section of the work being cut.

Another object of this invention is to provide an improved band guide and feed control for band saws and band-type cutoff saws, which is characterized by a bodily movable control element which moves along the path of the feeding motion of the machine and relative to the carrier for the band, in strict conformance with such motion of the band or blade, and by its said motion directly controls the feed force in a way to maintain a substantially uniform cutting rate despite changes in cross section of the work being cut.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which.

Figure 1:
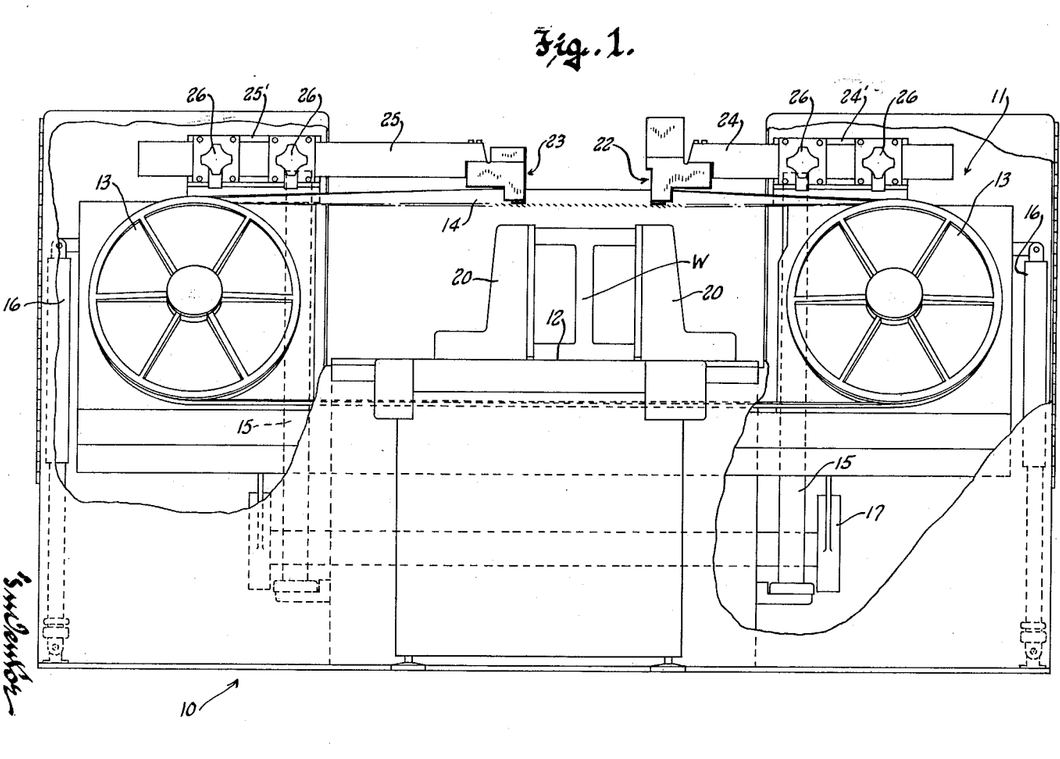
FIGURE 1 is a front view of a cut-off saw like that of Patent No. 2,898,669, equipped with the improved saw guide and feed control of this invention, parts of the view being broken away, and the saw head being shown raised and about to be lowered onto the work.
Figures 2, 3:
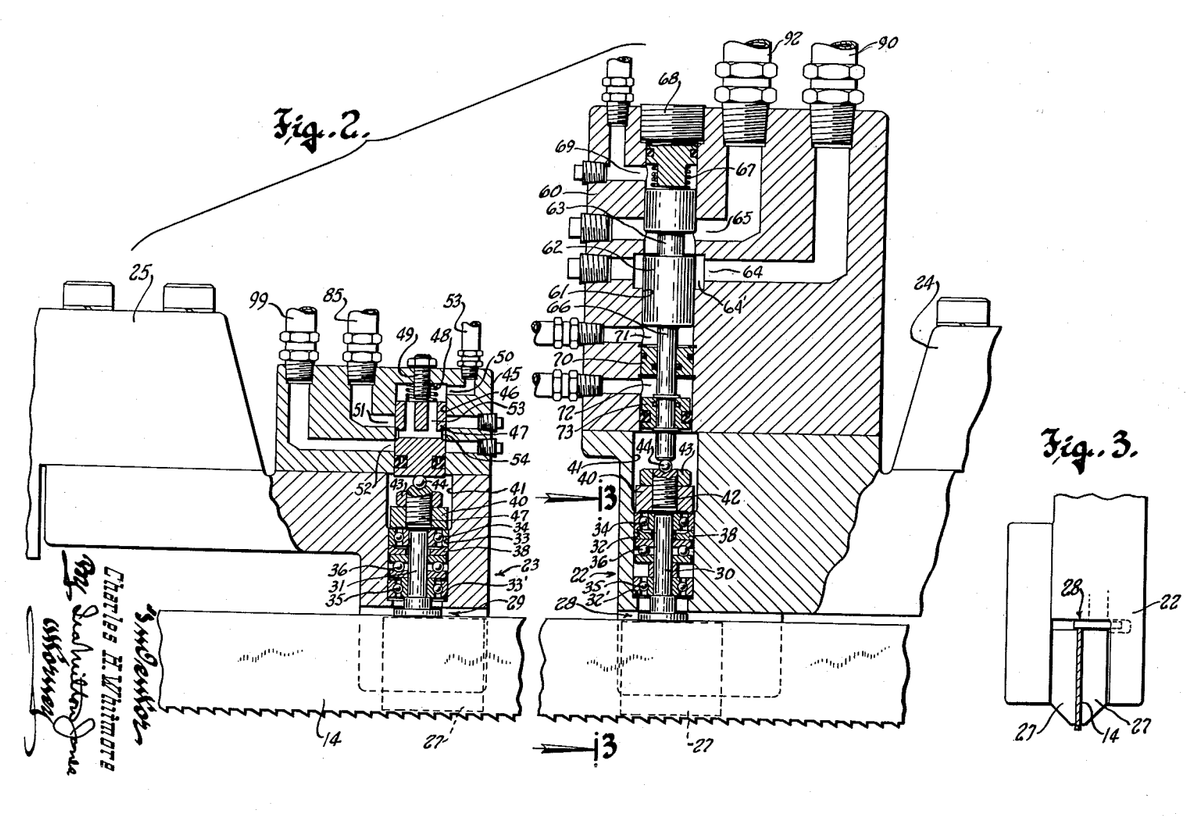
FIGURE 2 is a view essentially in vertical section through both guide units, the one at the right being the control guide unit, i.e. being the unit which actually controls the descent of the saw head, said view being at a scale considerably larger than that of FIGURE 1.
FIGURE 3 is a detail sectional view through FIGURE 2 on the plane of the line 3—3, to illustrate particularly the side guides for the band or blade.

Referring now particularly to the accompanying drawings, and especially to FIGURES 1 and 2, the numeral 10 designates the base of a band-type cutoff saw similar to that forming the subject matter of the Crane et al. Patent No. 2,898,659.

Mounted upon the base 10 for translatory vertical movement is a saw carrying head or frame, designated generally by the numeral 11. This frame is substantially U-shaped and has its arms disposed at opposite sides of a work supporting table 12 on the base to embrace the work W set upon the table with the part thereof which is to be cut, in the work zone. Pulleys 13, at least one of which is power driven, are mounted on the arms of the saw carrying frame or head, and trained about these pulleys is an endless saw band or blade 14.

Since the cutoff machine illustrated in FIGURE 1 is like that of the aforesaid Crane et al. patent, it is the upper stretch of the band which does the cutting. The lower stretch is at all times disposed beneath the work supporting table 12, even in the fully raised position of the head, in which position it is shown in FIGURE 1.

The frame or head 11 slides upon a pair of vertical posts 15 rigidly mounted on the frame; and hydraulic cylinders 16 having their rams connected to the base provide power means to elevate the frame or head. The posts are relatively widely spaced, and the connection between the frame or head and the posts is provided by a pair of widely spaced bearings (not shown) on each arm of the frame, in which the posts are slidably received. In addition, in the hope of constraining the frame or head to exactly translatory motion, the opposite ends of the frame or head are connected with the base by a linkage and torque bar device 17, which has as its purpose to constrain both ends of the frame to move in unison as the frame is raised and lowered.

Theoretically, therefore, the frame or head should be incapable of any motion other than true vertical translation, and its descent by gravity (no matter how slow) as well as its power actuated elevation should be smooth and uninterrupted. Hang-up or binding, either at the guide posts 15 or in the hydraulic cylinders 16, should not occur. However, in practice, this ideal condition does not exist. There is always a certain amount of "hang-up" of the head as it descends during operation of the machine, and, because of it, the feed of the saw band through the work W is not smoothly continuous. In the past this resulted in a seriously fluctuating band load, poor cutting accuracy and/or poor surface finish.

The work W is held in position upon the base by cooperating hydraulically actuated vise jaws 20, but since the present invention is not concerned with the way these jaws are actuated or controlled, this feature of the machine has not been illustrated.

The axes of the pulleys 13, of necessity, are more nearly horizontal than vertical, but the cutting stretch of the band must be vertical, that is, the band must have its faces exactly parallel to the direction of feed motion. It follows, therefore, that this stretch of the band must be twisted and held exactly vertical as it enters and leaves the work zone. This is accomplished by a pair of right and left guide units, respectively designated by the numerals 22 and 23. The right-hand guide unit 22, as will be hereinafter more fully developed, controls the downfeed of the saw head; the other unit 23, which is at the left side of the work zone, may be considered as a follower, from the standpoint of feed control.

The guide units 22 and 23 are mounted upon the saw head or frame 11 in a manner enabling them to be adjusted toward and from one another to narrow or widen the work zone within the capacity of the machine. To so mount the guide units, they are respectively fixed to arms 24 and 25, which in turn are longitudinally slidably received in ways machined into brackets 24'–25' on the frame or head. The machined ways are exactly in line with one another and parallel with the upper stretch of the band, so that in any position of adjustment the arms 24 and 25 hold the guide units in position to constrain that part of the upper stretch of the band spanning the guide units to travel in a vertical plane, with its toothed edge facing downwardly.

Clamping screws wih hand wheels 26 are provided to clamp the arms 24 and 25 in any adjusted position, which for best results is that at which the guide units are closely adjacent to the opposite sides of the work to be cut.

To the extent that the guide units 22 and 23 function to guide and hold the cutting stretch of the saw band in a vertical plane, they are substantially identical. Thus, each has a pair of cooperating guide shoes 27 at the underside of its body casting to slidingly engage the opposite sides of the saw band or blade and hold it firmly in its proper vertical disposition as it travels through the cutting zone. FIGURE 3 perhaps offers the best illustration of these side guides or shoes, but it should be understood that the specific construction of these guide shoes forms no part of the present invention. Preferably, they are like the guide shoes illustrated in FIGURE 6 of the copending application Serial No. 707,967, now Patent No. 2,934,106.

In addition to the guide shoes 27 which engage the sides of the band, the guide units 22 and 23 have backup bearings or rollers respectively designated by the general reference characters 28 and 29, against which the back edge of the band bears, and by which the feeding force is applied to the band. These backup bearings or rollers comprise spindles 30—31, freely rotatably mounted in vertical bores 32—33 in the body castings of the two guide units. At their lower ends, the spindles have downwardly facing flat surfaced heads against which the back edge of the saw band bears. So that the spindles will turn as the band passes under them, the engagement of the band with their downwardly facing surfaces is closer to the edges of the heads than their centers. The diameter of the heads is slightly less than that of the lower ends of the bores, which are somewhat reduced to provide upwardly facing shoulders 32'—33', so that the spindles together with their bearings may be inserted into the bores from the top.

A distinguishing characteristic of the backup rollers is that their spindles 30—31 have a degree of free axial motion in their respective bores. The purpose of this limited axial freedom will be discussed hereinafter. At this point, the explanation will deal only with the structure by which the backup rollers are mounted to be both freely rotatable and axially movable within limits. Thus, the spindle of each backup roller is supported in a pair of axially spaced upper and lower ball bearings 34 and 35, respectively. The outer races of these bearings have a free sliding fit in their respective bores 32—33, and in each case the outer race of the lower bearing seats upon the adjacent shoulder (32'—33') to define the limit of downward axial motion permitted the backup rollers.

Interposed between the upper and lower bearings 34 and 35 are thrust bearings 36, the lower races of which have a thrust transmitting connection with the inner races of the lower bearings 35, either directly or through a spacer; and since these inner races of the bearings 35 seat upon upwardly facing shoulders on the spindles, upward end thrust imparted to the backup rollers is transmitted to the thrust bearings. The upper races of the thrust bearings 36 are arranged to transmit upward end thrust to the outer races of the upper bearings 34 through washers 38. To avoid engagement between the washers 38 and the inner races of the bearings 34, the upper faces of the washers are relieved, as shown. Hence, upward end thrust imposed upon the backup rollers is transmitted through the thrust bearings 36 to the outer race of the upper bearings 34.

The upward end thrust transmitted to the outer races of the upper bearings 34 is imparted to collars 40, which are freely axially movable in the upper enlarged portions 41 of the bores 32—33. A screw 42 is threaded into each collar and locked in an adjusted position by a lock nut 43, and in the uppermost end of each screw is a socket in which a ball 44 seats to provide a thrust transmitting connection between each spindle and a valve spool slidably mounted thereabove, this ball connection accommodating any possible misalignment between the spindle and the valve spool. Since the valve spools of the two guide units are not alike, either in structure or in function, they will be separately described.

The left-hand guide unit has a valve body 45 seated upon and secured to the top of its body casting across the top of its bore 32; and coaxially communicating with the bore 32 the valve body 45 has a cylindrical valve spool chamber 46. In this chamber is a slidably mounted valve spool 47, the lower end of which is seated upon the ball 44. A spring 48 confined between the upper end of the valve spool and the underside of a plug 49 threaded into the upper end of the chamber 46, yieldingly urges the valve spool 47 downwardly. Since the valve spool abuts the plug 49 in its uppermost position, the threaded engagement of the plug 49 in the end wall of the chamber 46 provides an adjustment for the axial travel permitted the spool 47 and the backup bearing or roller 29.

Three ports 50, 51 and 52 open to the valve spool chamber 46; the port 50 leading to the upper end of the chamber and the other two ports opening to the side of the chamber at axially spaced points.

The valve spool 47 controls communication between the ports to either disconnect the port 50 from both of the other ports 51 and 52, or connect the port 50 with one or the other of the ports 51—52. For this purpose, the spool has an internal passage (or passages) 53 leading from its upper end to a groove 54 encircling the spool medially of its ends. The width of this groove is less than the shortest distance between the side ports 51 and 52 so that in its neutral position the spool disconnects the port 50 from both side ports. Slight endwise motion of the spool, however, connects either the side port 51 or the side port 52 with the port 50, depending upon whether its endwise motion is upward or downward.

The spool 47 serves not only as a movable valve member but also as a piston. Fluid pressure in the upper portion of the valve chamber 46 exerts a downward force upon the top of the spool. This force is, of course, in addition to that applied upon the spool by the spring 48, and ordinarily is far in excess of the spring force, so that essentially it is the fluid pressure in the upper end of the chamber which determines the feeding force applied to the saw blade by the backup bearing or roller 29, and the magnitude of this fluid pressure determines where—between its upper and lower limits—the backup bearing or roller 29 will float with respect to the saw head. The value and purpose of this "floating" disposition of the backup bearing or roller 29 will be brought out hereinafter.

At the right guide unit 22, which is the feed control unit, a valve body 60 is seated upon and secured to the top of its body casting. This valve body 60 has a vertical bore 61 extending therethrough coaxially of the bore 32. Slidably mounted in the bore 61 is a valve spool 62 which also serves as a piston. The medial portion of this spool is reduced in diameter as at 63 to form an annular passage which provides controllable communication between ports 64 and 65, that open to the side of the bore 61 at vertically spaced points, the former terminating in an annular chamber or cavity 64' which encircles the spool. A stem 66 projects axially downwardly from the spool 62 and into the bore 32 to bear upon the adjacent ball 44.

A compression spring 67 reacting between the upper end of the valve spool 62 and the underside of a plug 68 threaded into the upper end of the bore 61 biases the spool and the back-up bearing or roller 28 towards their lowermost positions with respect to the saw head or frame, which positions are defined by the engagement of the bearing 35 with the shoulder 32'. The upper limit of the permitted axial motion of the valve spool and backup bearing or roller is defined by the plug 68 and hence is adjustable.

In addition to the downward force applied by the spring 67, fluid pressure is also exerted on top of the valve spool 62. This fluid pressure results from having the upper end of the cylinder 61 connected with a source of fluid pressure through a port 69.

When the back-up bearing or roller 28 and the valve spool 62 float in their neutral or medial positions, the annular passage 63 is so disposed with respect to the upper edge of the annular chamber or cavity 64' and the port 65, that a predetermined relatively small degree of communication is established between ports 64 and 65 and, as will be hereinafter more fully described, it is the extent of the communication between these ports which controls the rate of descent of the saw head or frame.

The lower end portion of the bore 61 is divided by a barrier 70 into axially spaced cylinders 71 and 72. Functionally, this barrier could be an integral part of the body 60, but to allow for assembly, the barrier is a separate part secured in place by snap rings, as shown. The stem 66 passes slidably through the barrier 70, and to prevent leakage suitable seals are provided, both at the wall of the bore 61 and at the stem 66.

A piston 73 is secured to the stem 66 to operate in the lower cylinder 72, the securement again being preferably made by snap rings which, in this case, engage the stem. The cylinders 71 and 72 contain fluid under pressure, and if the pressures within the two cylinders were equal, they would have no effect, one way or the other, upon the floating valve spool 62 and the backup bearing or roller 28. On the other hand, if the pressure in the lower cylinder drops relative to that of the upper cylinder, the upwardly acting forces exerted on the valve spool 62 will be proportionately increased, and as a result, assuming that all other forces remain unchanged, there will be an upward displacement of the spool. The significance of this feature will become clear as the description proceeds.

To enable the cylinders 71 and 72 to have fluid pressure manifested therein, they have ports 74 and 75, respectively, through which the cylinders may be connected with a source of fluid under pressure.

The Hydraulic Control System and Its Operation

Figure 4:
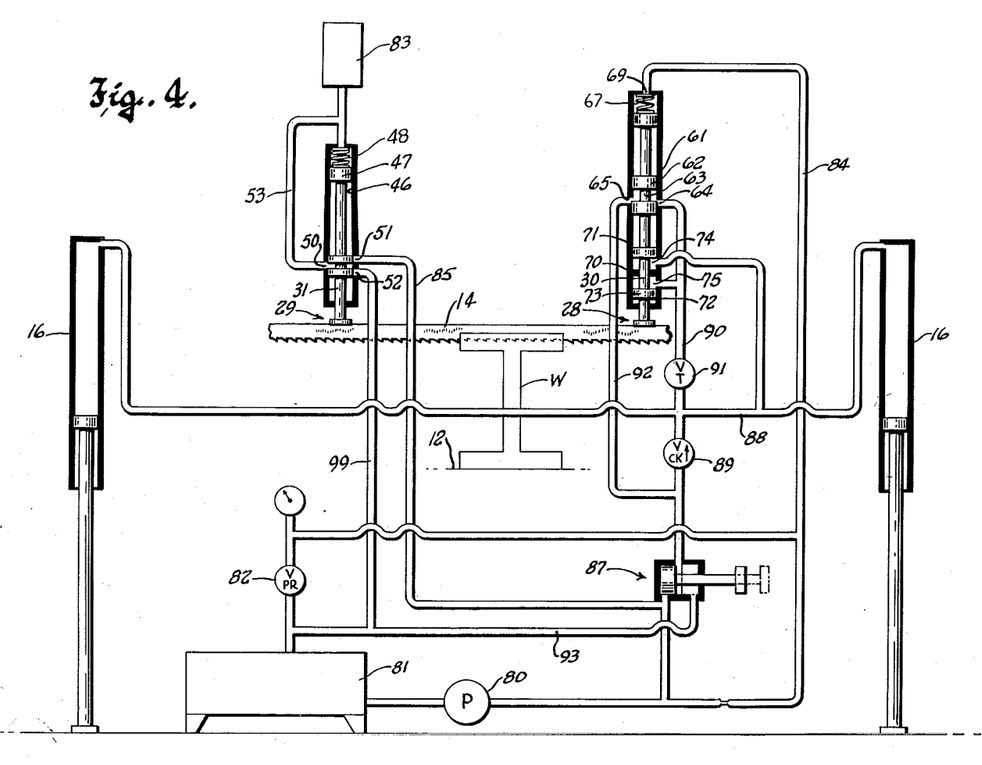
FIGURE 4 is a diagrammatic view of the entire control system, illustrating the same in the condition it is when the machine is in operation sawing through a piece of work.

The essential elements of the hydraulic feed control system are illustrated in FIGURE 4. As here shown, a pump 80 takes oil or other suitable hydraulic fluid from a tank 81 and delivers it to the system at a pressure determined by the setting of an adjustable back pressure valve 82 in a by-pass line connecting the discharge side of the pump with the tank. Preferably this adjustable back pressure valve, and also a pressure gage connected in the line ahead of the valve, are mounted on the control panel of the machine (not shown), since it is the setting of this valve which determines the feeding force, and the back pressure valve is thus one of the controls which enable the operator to select a desired cutting rate.

In FIGURE 4, the system is illustrated in the condition which obtains when the saw is in operation and cutting through a piece of work. This means that the main manual control valve of the system, indicated generally by the numeral 87, is in its "Operating" position at which it establishes communication between the hydraulic cylinders 16 and the tank 81. However, before cutting could begin, the saw head or frame had to be elevated and, to do so, the control valve 87 was shifted to its "Elevate" position (shown in dotted lines in FIGURE 4), in which position the discharge side of the pump was connected to the cylinders 16, the connection from the valve to the cylinders being through a line 88 in which a check valve 89 is located.

As long as the control valve 87 is in its "Elevate" position, the cylinders 16 not only support the entire weight of the saw head but hold it against descending. As soon as the valve 87 is shifted to its "Operating" position, fluid flows from the cylinder and the saw head begins to descend. The rate at which it descends depends upon how fast the hydraulic fluid can leave the cylinders 16 and this, in turn, depends upon the extent of the communication between the ports 64 and 65 in the body 60 of the feed control unit, since these ports and the annular chamber or cavity 64' to which the port 64 opens, are connected in the return from the cylinders to the tank. This return comprises the line 88, a line 90 which has an adjustable orifice 91 connected therein for a purpose to be hereinafter described, the cylinder 61, a line 92, the valve 87, and a line 93.

Until the saw blade engages the work, the descent of the saw head and, hence, the velocity of the feeding motion is maximum, since at this time the communication between the ports 64 and 65 is maximum as a result of the spool 62 being in its lowermost position. It is held in its lowermost position by the spring 67 and the fluid pressure manifested in the upper end of the bore 61 as a result of the port 69 being connected with the pump through a line 84. The magnitude of this fluid pressure is, of course, determined by the setting of the back pressure control valve 82.

Until the saw blade engages the work, the spool 47 in the left-hand guide unit is also in its lowermost position, being held there by the spring 48. With the spool 47 in its lowermost position, the ports 50 and 52 are communicated and, as a result of that communication, there is no fluid pressure above the spool 47 nor in an accumulator 83 which is at all time connected with the upper end of the bore 46, the communication between ports 50 and 52 having connected the accumulator and the upper end of the bore 46 with the tank 81 through a line 99.

When the saw blade comes into contact with the work, such engagement imposes an upward reaction force upon the spool 62 of the right-hand guide unit, which force opposes the downward biasing force exerted by the spring 67 and the fluid pressure manifested in the upper end of the bore 61, and moves the spool upwardly in its bore until the forces acting on the spool are in equilibrium. As the blade cuts through the work, the spool may at any time move relative to the head in either direction parallel to the path of feeding motion, and it does so in order to maintain a bias upon the saw blade which urges it in the direction toward the work with a force that remains substantially unchanged so long as there is no change in the length of the cut, as determined by the cross section of the work piece. Thus the feeding force is independent of feeding velocity of the saw head, because of the capability of the support 28 for motion independently of the head, and is determined by the adjustment of the back pressure control valve 82 which regulates the pressure in the system.

To appreciate how the adjustment of the hydraulic pressure in the system determines the feed force that is exerted upon the saw blade, it must be realized that the valve spool 62, in association with the ports it controls and the pressure of the spring 67, acts as a servo.

The purpose of the spring is to provide a force which varies with the position of the spool, and this makes the device a proportional control. Thus, if the effect of pressure differential in the cylinders 71 and 72 is discounted for the moment and for ease of explanation, the forces acting upon the spool 62 will be the hydraulic force and spring force on top of the spool and the opposing or reaction force of the saw band or blade against the backup bearing 28. If the latter force, i.e. the force of the band or blade against the backup bearing requires a downward force of 180 pounds to hold the spool at its control point or normal position, a decrease in this reaction force to 179 pounds would allow the combined spring and hydraulic force to move the spool downward until the spring force decreased by one pound, whereupon the spool would come to rest. But in its new position the communication between the ports 64 and 65 would be slightly greater than it had been, allowing more fluid to flow from the head cylinders 16. Had the band force (the upward or reaction force) decreased to 178 pounds, the spring would have moved the spool proportionally further and the orifice formed by the communication between the ports 64 and 65 would have been proportionally greater.

This action always tends to drive the spool 62 back to its control point, and in so doing, provides smooth recovery from changed load conditions.

The location of the control point or "normal position" of the valve spool 62, thus is mainly a function of the speed at which the head descends and the fluid flows out of its cylinders 16. The total "float" or motion of the spool permitted by its stops is only 1/32 of an inch above and 1/32 of an inch below its control point; and the variation in location of the control point due to difference in the quantity of fluid passing through the orifice (from port 64 to port 65) varies by only .005 or .006 of an inch.

The throttling effect upon the flow of fluid from the cylinders, of course, retards the descent of the saw head, and hence the amount of throttling that takes place at ports 64 and 65 controls the velocity of descent of the head. The valving action at those ports is such as to so regulate the downward velocity of the head that it in effect follows the back-up bearing 28.

To adapt the machine to the cutting of different metals and different cross sectional shapes, the back pressure control valve 82 should be able to adjust the pressure in the system through a wide range which, for purposes of illustration, may extend from a high of 500 lbs. to a low of 20 lbs. No matter what the adjustment of the hydraulic pressure is, the backup bearings or rollers 28 and 29 and, of course, their respective valve spools, normally will float somewhere between their upper and lower limits of movement with respect to the saw head or frame. As sawing conditions and pressures in the system vary, the backup bearings or rollers will seek different normal positions intermediate their limits.

If the work being sawed is of uniform width and uniform hardness, and if it could be assumed that nothing would interfere with the smooth uniform gravity produced descent of the saw head, and if the width of the saw band were absolutely uniform and the band were entirely free from dog-leg, the sawing operation would proceed uniformly at a predetermined rate and neither backup bearing nor roller 28 or 29 would move either up or down from its normal or neutral position with respect to the saw head or frame. But, in practice, these ideal conditions do not exist.

Therefore, unless the possible variables are compensated, band loading is apt to be erratic, cutting accuracy suffers, and the maintenance of an optimum cutting rate is impossible. Variations in band width and dog-leg which heretofore produced a fluctuating band loading, are practically entirely offset by the fact that the backup bearings or rollers 28 and 29 are yieldingly maintained in their normal positions. Thus the passage through the work zone of a too-wide portion of the band will merely cause the back-up bearings or rollers 28 and 29 to rise slightly, whereas a suddenly encountered decrease in band width will simply allow the backup bearings or rollers to drop slightly. Dog-leg will be accommodated in the same way.

Such up and down floating of the backup bearings or rollers caused by variation in band width and/or dog-leg, may be as much as twenty thousandths of an inch, and as can no doubt be appreciated, the up and down floating of the backup bearings or rollers takes place without materially increasing or decreasing the loading upon the teeth of the band or blade.

If a hard spot in the metal is encountered, or when the saw blade enters upon a wider cross section in the work, both backup bearings or rollers and their respective valve spools will be displaced upwardly from their normal position by the increased reaction of the work against the saw blade. The upward displacement of the valve spool 62 will decrease the communication between ports 64 and 65 and slow down the descent of the saw head, but feeding force will be maintained. As the rate of descent of the head decreases, the downward bias upon the right-hand back-up bearing 28, exerted by the spring 69 and hydraulic pressure in the cylinder 61 acting through the spool 62, will maintain the feeding force, at least until the lower limit of relative motion between the backup bearing or roller and the saw head is reached; and at the left-hand guide unit or follower, the feeding force will be similarly maintained by the connection of the accumulator 83 and the valve spool chamber 46 with the high pressure side of the system, as a result of communication between the ports 50 and 51.

In the event descent of the saw head or frame is momentarily interrupted or slowed down by means other than the reaction of the work against the saw blade, as, for instance, by binding or hang-up at the guide posts or the hydraulic cylinders, the feeding force will be maintained by the downward bias upon the backup bearings or rollers. Not only will this downward bias maintain the feeding force but, by increasing the communication between the ports 64 and 65, the counterbalancing effect of the hydraulic fluid in the cylinders 16 will be decreased. As a result, the condition causing the momentary hang-up or binding will be more readily and more quickly corrected.

In the foregoing description of the control system and its manner of operation, it has been shown how this invention maintains substantially uniform cutting and substantially uniform band loads, despite interference caused by varying band width, dog-leg, hard spots in the metal being sawed, and hang-up or binding which produces momentary interruptions in the descent of the saw head. But there is still another condition which will seriously affect the cutting rate. This is variation in the cross section of the work piece being sawed.

A changing cross section or, more accurately, differences in the length of the cut being made, will affect the cutting rate unless the feed rate is appropriately adjusted. To help visualize this point, the work piece, where shown, is in the form of an H bar so placed that the cut is first made through one of the flanges. This placement of the work piece has been chosen for illustrative purposes, despite the fact that in practice it may be more logical to place the bar with its flanges vertical and gripped by the vise jaws.

Figure 5:
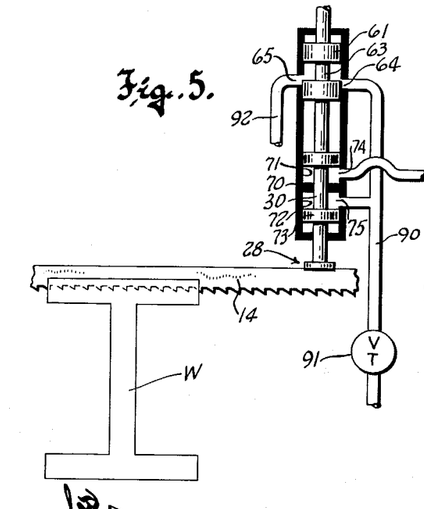
FIGURES 5, 6 and 7 are fragmentary diagrammatic views collectively illustrating how the control system achieves a substantially constant sawing or cutting rate, despite changes in the cross section of the work and the feeding force required.
Figure 7:
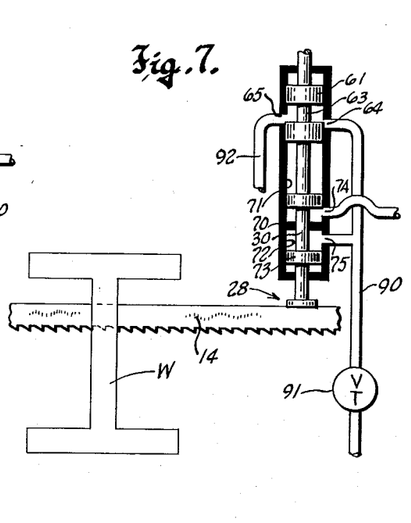

If the cross sectional size and shape of each flange of the H bar is the same as that of the web, for instance, each 2" x 12", it follows that if a uniform cutting rate is to be maintained, the saw must cut through each flange in the same time that it takes to cut through the web. In each case, 24 square inches must be cut. Since the force required to feed the saw through the work varies with the length of the cut being made, the feeding force needed to cut through the flange, as in FIGURE 5, must be greater than it is when the saw is cutting through the web, as in FIGURE 7, if the cutting rate is to be kept constant.

Figure 6:
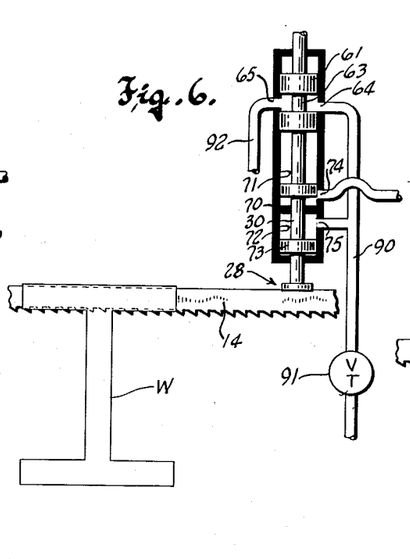

Conversely, as soon as the blade cuts through the top flange and begins its cut down through the web, as shown in FIGURE 6, the feeding force must be abruptly reduced to a value below that of the force that had been applied on the blade as it cut through the flange.

To effect the required adjustment of the feeding force is the function of the cylinders 71 and 72 and the adjustable orifice 91. The manner in which these elements function to effect their purpose will now be described, and it is suggested that reference be had particularly to FIGURES 5, 6 and 7.

As already brought out, the hydraulic fluid leaving the cylinders 16 flows through the adjustable orifice 91 on its way to the port 64. The static pressure in the line downstream from the orifice 91 is manifested in the lower cylinder 72 since its port 75 is connected with the line 88 downstream of the orifice. The static pressure upstream of the orifice is manifested in the upper cylinder 71, since its port 74 is connected with the line 88 upstream of the orifice.

Hence, the pressure in the upper cylinder 71 is not affected by the rate at which the fluid leaves the cylinders 16, but the pressure in the lower cylinder 72 is affected by this rate. This follows from the fact that as the velocity of the fluid flowing through the orifice 91 increases, in consequence of decreased restriction between ports 64 and 65, the static pressure downstream of the orifice decreases. Any differential in the pressures in the cylinders 71 and 72 thus is a measure of the velocity of the feeding motion or, in other words, the descent of the saw head.

As the saw blade breaks through the flange and begins its cut down through the web (FIGURE 6) there is an abrupt reduction in the reaction of the work against the saw blade. With this reduction in reaction, the spool 62 is forced downwardly in its cylinder 61 and, as a result, the communication between the ports 64 and 65 is increased. This allows the fluid to flow from the cylinders 16 at a much more rapid rate and thus increases the velocity of the flow through the orifice 91. As a result of the increased flow through the orifice 91, the pressure in the lower cylinder is less than in the upper cylinder 71.

With this pressure differential in the cylinders 71 and 72, a new upward force is applied upon the control spool 62. This added upward force shifts the spool 62 upwardly and thereby reduces the communication between the ports 64 and 65, which, in turn, proportionately reduces the rate of descent of the head. The net result is a substantially uniform cutting rate, despite the abruptly narrowed width of the work being cut.

Although for most materials no adjustment is needed at the orifice 91, it is preferable that the orifice be adjustable. Its adjustment is conveniently effected by first setting the pressure control valve 82 for the feeding force needed to achieve the optimum cutting rate for the given material and the appropriate saw blade, and then a test sample 12″ wide and 2″ thick (comparable to one of the flanges of the H beam shown as the work piece) is cut, with the saw traversing the 12″ dimension. After that section has been cut, the test piece is mounted edgewise. The orifice is now adjusted until the time required to cut through the piece in this position is the same as that needed to make the first cut.

Since the backup bearing or roller 29 (the follower) moves toward its lowermost position with respect to the saw head when the reaction of the work against the saw blade abruptly decreases—as when the saw blade breaks through the flange and begins its cut through the web of the work piece, and since this bearing or roller should "float" medially of its upper and lower limits during the cutting, the pressure exerted upon its valve spool 47 should be reduced when the bearing or roller 29 moves downward from its normal medial position. This is accomplished as a result of communication between the ports 50 and 52.

When the ports 50 and 52 are connected by downward displacement of the spool 47 in its cylinder or chamber 46, some of the fluid in the accumulator flows out to the tank through a line 99 which leads from the port 52 and, as a result, the pressure above the spool 47 is reduced, allowing the backup bearing or roller 29 to resume its normal position somewhere between its upper and lower limits of motion.

Conversely, as already explained, when the backup bearing 29 is moved upwardly from its normal position port 50 is communicated with port 51 to send fluid under pressure from the pump to the accumulator 83 and the upper portion of the cylinder 46, which fluid supplements the downward biasing force of the spring 48 and returns the spool to its normal position.

Figure 8:
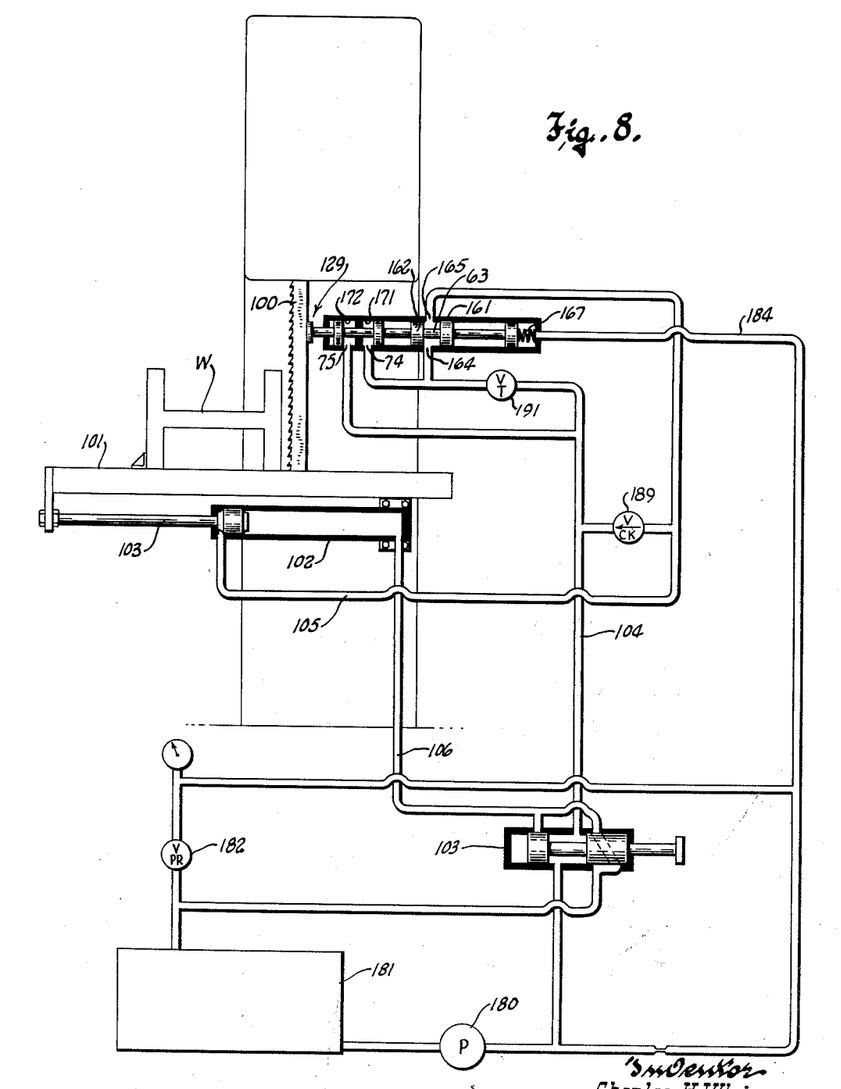
FIGURE 8 is a view more or less diagrammatically illustrating the application of this invention to a conventional band saw equipped with a power driven work feed table.

*The Modified Embodiment of the Invention—FIGURE 8*

In FIGURE 8, the invention has been illustrated as applied to a conventional band saw in which the saw band or blade 100 travels downwardly through the work zone and the work W is carried by a horizontal work supporting table 101. The work supporting table is mounted for horizontal traverse to feed work thereon to the saw blade. A hydraulic cylinder 102 mounted on the frame of the machine and having its ram 102′ connected with the table, provides power means for advancing and retracting the table. Thus, by feeding fluid under pressure into one end or the other of the cylinder, the table may be advanced or retracted; and by controlling the flow to the cylinder, the feeding or cutting force may be regulated.

Hydraulic pressure is manifested at either end of the cylinder 102 by actuating a main control valve 103 from one extreme position to the other. With the valve 103 in the position shown, a pump 180 delivers fluid at full pressure to a pressure line 104, and at the same time fluid pressure of a magnitude determined by the setting of an adjustable back pressure valve 182, is applied through a line 184 upon a valve spool 162.

The pressure line 104 has a variable orifice 191 connected in it, and leads to port 164 of a cylinder 161 which is fixed with respect to the frame of the machine. The control spool 162 slides back and forth in the cylinder 161, to control communication between port 164 and a port 165, and as in the other embodiment of the invention, the spool is connected with a backup bearing or roller 129 to move in unison therewith. The backup bearing or roller supports the cutting stretch of the saw blade against the thrust of the work thereon, and a spring 167 and the hydraulic pressure applied through line 184 yieldingly urges the spool and backup towards the saw blade.

Since the work has not yet engaged the saw blade (in FIGURE 8) the spool 162 and the backup bearing or roller 129 are in their farthest advanced positions, i.e. at the limit of their movement toward the saw blade. Maximum communication thus exists between ports 164 and 165, and as a result, the full hydraulic force is applied through a line 105 to the left-hand end of the cylinder 162. Immediately, the ram 102′ begins to move toward the right to advance the table 101 and feed the work W against the saw band, the fluid discharging from the right hand end of the cylinder being led back to the tank 181 through a line 106, which connects that end of the cylinder with the tank through the valve 103.

As the work comes into engagement with the saw blade and applies its reaction force thereon, the backup bearing or roller 129 and the control spool 162 are moved toward the right until the reaction balances the yieldable force provided by the spring 167 and the hydraulic pressure in line 184 which together urge the spool towards the saw blade, and, as a result, the degree of communication between the ports 164 and 165 is reduced. With that reduction, as in the other embodiment of the invention, the flow of hydraulic fluid through the duct 105 is reduced and the advance of the work supporting table 101 is proportionately slower.

Inasmuch as the control spool 162 and the backup bearing or roller 129 float in an intermediate position, all of the advantages heretofore discussed are achieved in this adaptation of the invention as well as in the other. Variations in band width and dog-leg in the band or blade are accommodated by the freedom of the backup bearing to move forward and back, and any other condition which would have an objectionable effect upon the band loading is either eliminated or minimized.

Likewise, when the cross section of the work being sawed or, more accurately, the thickness of the piece being traversed by the saw blade, is less, the feeding force is correspondingly reduced, so that the cutting rate is maintained substantially constant.

This result is accomplished in the same way that it was in the other form of the invention i.e. by means responsive to a differential in pressure in cylinders 171 and 172. Cylinder 171 is connected with the fluid pressure system downstream of the adjustable orifice 191 and cylinder 172 is connected with the system upstream of the orifice. Hence, when the backup bearing 129 and the control spool 162 moves to the left as the reaction of the work against the blade suddenly decreases, and the communication between ports 164 and 165 is correspondingly enlarged allowing the fluid to flow through the orifice 191 at a faster rate, the resulting pressure differential in the cylinders 171 and 172 acts upon the control spool 162 to proportionately reduce the communication between the ports and thereby diminish the feeding force.

It will be noted that in the embodiment of the invention shown in FIGURE 8, only the control backup bearing or roller has been illustrated. This backup is part of the upper band guide unit. There is, of course, a lower guide unit below the table 101, and its backup bearing or roller may be of the "floating" construction as in the follower unit 23 of the other embodiment of the invention, or it may be a conventional fixed back-up. In fact, most of the advantages of the invention would be realized even in the cutoff saw embodiment of the invention, if the backup bearing or roller 29 of its follower unit were fixed, that is, not capable of floating up and down.

When the work has been sawed and the table is to be retracted, the valve 103 is actuated to feed the full pump pressure to the right-hand end of the cylinder 102, and to enable rapid traverse of the table on its return stroke, a check valve 189 connects line 105 with line 104. This allows the fluid to by-pass the control unit.

From the foregoing description taken in connection with the accompanying drawings, it will no doubt be apparent to those skilled in this art that this invention constitutes a very significant improvement in band saws and band-type cutoff machines and, for that matter, machine tools generally, having comparable functions; especially because of its attainment of a constant cutting rate despite changing conditions which, ordinarily, would cause the cutting rate to fluctuate seriously from the selected optimum rate. It will also be apparent that the invention possesses the very important advantage of maintaining a substantially constant feeding force between the saw teeth and the work piece being sawed while sawing a uniform cross section, regardless of variations in band width and other conditions which heretofore have caused erratic band loading. The net result accomplished by the invention, therefore, is:

(1) Longer band life—since all parts of the band receive the same amount of wear.

(2) Higher cutting rates without overloading the saw teeth.

(3) Straighter cuts at high cutting rates.

(4) Better finish of the work piece with respect to greater accuracy and smoothness of cut.

What is claimed as my invention is:

1. In a machine tool of the type having a work supporting element and a tool carrier element with a cutting tool thereon, one of said elements being mounted for feeding motion relative to the other and said machine having means for effecting such feeding motion of said one element; means carried by the tool carrier element to guide the cutting tool for limited motion relative to the tool carrier element along a path parallel to the direction of feeding motion; tool supporting means carried by said tool carrying element and mounted to engage the tool and through which feeding force is applied to the tool; biasing means reacting between the tool carrier element and the tool supporting means to urge the latter in said direction relative to the tool carrier element with a predetermined force which is independent of the position of the tool supporting means with respect to the tool carrier element; means reacting between the tool carrier element and the cutting tool to provide a supplemental biasing force that modifies said predetermined biasing force and cooperates therewith to provide a net feeding force under which the tool and a work piece on the work supporting element are engaged, and which supplemental biasing force so varies with changes in the position of the tool relative to the tool carrier element that the net feeding force decreases with movement of the tool relative to said tool carrier element in said direction and increases with such movement in the opposite direction; control means operatively connected with the cutting tool and responsive to its movement relative to the tool carrier element in each direction along said path; and means operatively connected with said means for effecting feeding motion and upon which the control means acts to so regulate the velocity of the feeding motion of said one element as to increase said velocity when the cutting tool moves in said direction relative to the tool carrier element and to decrease said velocity when the cutting tool moves in the opposite direction relative to the tool carrier element, whereby the net feeding force under which the tool and a work piece on the work supporting element are engaged can be maintained substantially uniform.

2. The machine tool set forth in claim 1, further characterized by the fact that: said first designated biasing means comprises fluid pressure responsive means connected between the tool supporting means and the tool carrier element; and means for applying a predetermined fluid pressure to said fluid pressure responsive means.

3. The machine tool set forth in claim 1 wherein said means providing the supplemental biasing force reacts between the tool carrier element and the tool supporting means.

4. The machine tool set forth in claim 3, wherein said means providing the supplemental biasing force is a spring.

5. The machine tool set forth in claim 2 wherein said means providing the supplemental biasing force is a spring reacting between the tool carrier element and the tool supporting means.

6. A machine tool of the type having a work supporting element and a tool carrier element with a cutting tool thereon, one of said elements being mounted for feeding motion relative to the other, said machine tool being characterized by means for engaging the cutting tool with a workpiece carried by the work supporting element under a feeding force having a magnitude which is so controlled as to maintain the cutting rate of the tool through the workpiece substantially constant despite variations in cross sectional shape of the workpiece, said means comprising: force transmitting means carried by the tool carrier element, engaging the cutting tool and supporting the same, said force transmitting means being mounted for limited motion relative to the tool carrier element along a path substantially parallel to the direction of feeding motion; means operatively connected with the force transmitting means for applying thereto a biasing force which urges the tool in the direction toward the work supporting element and the magnitude of which biasing force varies with the position of the force transmitting means along its path of motion, decreasing with motion in said direction of the force transmitting means relative to the tool carrier element; feed motion means connected with said elements for causing said one element to move at a controllably variable rate; regulating means for controlling said feed motion means to vary the rate of feeding motion of said one element in accordance with the magnitude of the biasing force being exerted on the tool by the force transmitting means, said regulating means comprising structure operatively associated with the feed motion means and the force transmitting means and responsive to the position of the latter along its path of motion to cause the rate of feeding motion to increase with motion of the force transmitting means in said direction, and to decrease with its motion in the opposite direction; and compensating means operatively associated with the feed motion means and the force transmitting means to so modify the biasing force upon the force transmitting means as to decrease said force with increasing feed rates and increase said force with decreasing feed rates.

7. The machine tool of claim 6, wherein said compensating means comprises: counterbiasing means reacting between the tool carrier element and the force transmitting means to provide biasing force which opposes that exerted upon the force transmitting means by the first designated biasing means; and means operatively associated with the feed motion means and with said counterbiasing means for increasing the force exerted by the latter with increasing feed rates and decreasing said force with decreasing feed rates.

8. In a band type sawing machine having a work supporting element and a tool carrier element, one of said elements being mounted for feeding motion relative to the other, the tool carrier element carrying spaced apart pulleys with an endless saw blade trained about them, one stretch of the saw blade being the cutting stretch and passing lengthwise through the work zone of the machine as feeding motion is imparted to said one element, means for so controlling the magnitude of the feeding force which the cutting stretch of the blade exerts against a work piece on the work supporting element as to maintain the cutting rate substantially constant, said means comprising: a back-up; means mounting the back-up on the tool carrier element in supporting engagement with the cutting stretch of the saw blade at one side of the work zone and for limited back and forth motion relative to said element along a path substantially parallel to the path of feeding motion; biasing means reacting between the tool carrier element and the back-up to urge the back-up and the cutting stretch of the saw blade relative to the tool carrier element in a direction towards a work piece on the work supporting element with a force that varies in magnitude with the position of the back-up along its path, decreasing with relative motion of the back-up in said direction; a movable control member connected with the back-up to move in correspondence therewith; feed motion means connected with said elements for causing said one element to have feeding motion at a controllably variable rate; feed rate control means connected with the movable control member to be responsive to the position thereof and operatively associated with the feed motion means for so controlling the rate of feed motion in accordance with the position of the control member as to provide for increasing feed rates with motion of the back-up in said direction and decreasing feed rates with motion of the back-up in the opposite direction; means operatively associated with the feed motion means for producing an output of a magnitude which varies with the rate of feed motion; and compensating means connected with said output producing means to be responsive to its output and operatively associated with the back-up to so modify the biasing force thereon as to decrease said force with increasing feed rates and increase said force with decreasing feed rates.

9. The structure of claim 8 further characterized by: a second back-up engaging the cutting stretch of the saw blade at the other side of the work zone; means mounting said second back-up on the tool carrier element for limited back and forth motion relative to said element along a path substantially parallel to the path of feeding motion; variable bias means operative to react between the tool carrier element and said second back-up to urge the latter in the direction towards a work piece on the work supporting element; and bias control means responsive to the position of the second back-up along its said path and operatively associated with the variable bias means to so regulate the magnitude of the biasing force exerted thereby as to increase said biasing force with motion of the back-up in said direction and decrease said biasing force with motion of the back-up in the opposite direction, to thus maintain the forces biasing the blade toward a work piece substantially the same at both sides of the work zone.

10. The structure of claim 9, further characterized by the fact that: said variable bias means comprises hydraulic cylinder and piston means operatively associated with the second back-up to apply thereto a biasing force proportional to the pressure of hydraulic fluid in said cylinder and piston means, a pressure accumulator so connected with the cylinder and piston means that the pressure of fluid in the latter corresponds to the pressure in the accumulator, and means providing a source of hydraulic fluid under substantially constant pressure; and wherein said bias control means comprises valve means connected with the back-up to move in unison therewith and so connected with the accumulator, said hydraulic fluid source and a vent as to permit fluid to flow from said source into the accumulator when the second back-up moves in said opposite direction from a predetermined position and permits fluid to flow from said accumulator to the vent when the back-up moves in said direction from said predetermined position.

11. The structure of claim 8, further characterized by the fact that the feed motion means comprises hydraulic cylinder means and means to connect said cylinder means with a fluid pressure source; and by the fact that the compensating means comprises a pair of pressure responsive force producing devices connected together in opposed relation to produce a resultant output force and connected with the control member to impose said output force thereon; and further by the fact that said output producing means comprises a hydraulic line connecting one of said devices with the hydraulic cylinder means so that said device is responsive to the static pressure in the cylinder means, a second hydraulic line connected with the hydraulic cylinder means and through which fluid flows during feeding motion of said one element at a velocity depending upon the velocity of the feeding motion of said one element, a restricted orifice in said second line so that the static pressure downstream of said orifice is proportionately less than that obtaining in the cylinder means as the velocity of the flow through said second line increases, and means connecting the other pressure responsive device with the second line downstream of said orifice so that the resultant output of said opposed pressure responsive force producing devices is a measure of the velocity of the feeding motion of said one element.

12. The structure of claim 8, further characterized by the fact that the means mounting the back-up on the tool carrier element comprises a cylinder fixed with respect to said element with its axis in line with the path of feeding motion, the back-up having a part slidably received in the cylinder, the control member also being slidably received in the cylinder and connected to said part of the back-up to move in unison therewith; and the means providing the biasing force acting on the back-up comprising a source of fluid pressure, duct means connecting the end of the cylinder remote from the back-up with the fluid pressure source, and piston means on said control member and disposed in the cylinder so that fluid pressure manifested in the cylinder imparts a biasing force upon the connected control member and back-up.

13. The structure of claim 12, further characterized by the fact that the means whereby feeding motion of said one element is effected comprises hydraulic actuating cylinder means and duct means connected with the same through which fluid can flow into and out of the hydraulic actuating cylinder means; and by the fact that the means by which the rate of feeding motion is regulated comprises inlet and outlet ports in said cylinder in which the control member slides, said ports being connected in series with said duct means, and means on the control member to adjust communication between said ports to increase the communication upon movement of the control member in response to the biasing force and decrease the communication upon movement of the control member in response to reaction to the feeding means to thereby control the rate at which fluid flows through said duct means.

14. The structure of claim 12 wherein said source of fluid pressure provides a pressure which is substantially uniform, further characterized by a spring reacting between the tool carrier element and the back-up to supplement the biasing force of the fluid pressure manifested in said cylinder and provide for variation in the magnitude of the biasing force on the back-up in accordance with its position.

References Cited in the file of this patent

UNITED STATES PATENTS

| | | |
|---|---|---|
| 1,469,689 | Prius | Oct. 2, 1923 |
| 2,104,258 | Hunter | Jan. 4, 1938 |
| 2,274,603 | Herman | Feb. 24, 1942 |
| 2,459,902 | Tucker | Jan. 25, 1949 |
| 2,602,987 | Wells | July 15, 1952 |
| 2,620,823 | Adams | Dec. 9, 1952 |
| 2,625,965 | Crane | Jan. 20, 1953 |
| 2,898,669 | Crane | Aug. 11, 1959 |

FOREIGN PATENTS

| | | |
|---|---|---|
| 166,101 | Australia | Nov. 23, 1955 |